(12) United States Patent
Kim et al.

(10) Patent No.: US 7,541,073 B2
(45) Date of Patent: Jun. 2, 2009

(54) ALIGNMENT FILM FOR LCD USING PHOTOREACTIVE POLYMER AND LCD COMPRISING THE SAME

(75) Inventors: Kyung Jun Kim, Daejeon Metropolitan (KR); Keon Woo Lee, Daejeon Metropolitan (KR); Byung Hyun Lee, Daejeon Metropolitan (KR); Min Young Lim, Seongnam-si (KR); Hye Won Jeong, Daejeon Metropolitan (KR); Sung Ho Chun, Daejeon Metropolitan (KR); Heon Kim, Yeosu-si (KR); Sung Joon Oh, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 530 days.

(21) Appl. No.: 11/334,357

(22) Filed: Jan. 19, 2006

(65) Prior Publication Data

US 2006/0159865 A1 Jul. 20, 2006

(30) Foreign Application Priority Data

Jan. 20, 2005 (KR) .................. 10-2005-0005544

(51) Int. Cl.
*C09K 19/00* (2006.01)
*C09K 19/06* (2006.01)
*C09K 19/52* (2006.01)
(52) U.S. Cl. .................. 428/1.2; 428/1.1; 428/1.3; 252/299.01; 252/299.6; 430/20
(58) Field of Classification Search ............ 252/299.01, 252/299.6; 430/20; 428/1.1–1.3
See application file for complete search history.

(56) References Cited

U.S. PATENT DOCUMENTS 5,464,669 A 11/1995 Kang et al.
2006/0160970 A1* 7/2006 Kim et al. ............... 526/171

FOREIGN PATENT DOCUMENTS

JP 11-181127 7/1999
JP 2002-047318 2/2002
KR 10-2002-0023172 A 3/2002

OTHER PUBLICATIONS

Dyaduysha, Andrey, et al., *Pecularity of an Oblique Liquid Crystal Alignment Induced by a Photosensitive Orientant*, Jpn. J. Appl. Phys. vol. 34, 1995, pp. L1000-L1002.
Schadt, Martin, et al., *Surface-Induced Parallel Alighment of Liquid Crystals by Linearly Polymerized Photopolymers*, Jpn. J. Appl. Phys. vol. 31, 1992, pp. 2155-2164.

* cited by examiner

*Primary Examiner*—Geraldina Visconti
(74) *Attorney, Agent, or Firm*—McKenna Long & Aldridge LLP

(57) ABSTRACT

The present invention provides a composition for forming a liquid crystal alignment film, which comprises a photoreactive polymer including a multicyclic compound having a photoreactive group on a main chain thereof. The present invention also provides a liquid crystal alignment film produced using the composition, and a liquid crystal display including the liquid crystal alignment film. The photoreactive polymer including the multicyclic compound on the main chain thereof has a high glass transition temperature, thus thermal stability is excellent. Since lattice vacancy is relatively large, the photoreactive group is capable of moving relatively freely in the main chain of the polymer, thus it is possible to improve a slow photoreaction rate, which is considered a disadvantage of a conventional polymer material.

19 Claims, 2 Drawing Sheets

ALIGNMENT FILM FOR LCD USING PHOTOREACTIVE POLYMER AND LCD COMPRISING THE SAME

TECHNICAL FIELD

The present invention relates to a composition for forming a liquid crystal alignment film, which includes a photoreactive polymer, a liquid crystal alignment film produced using the composition, and a liquid crystal display including the liquid crystal alignment film. More particularly, the present invention relates to a composition for forming a liquid crystal alignment film having a photoreactive polymer in which, since a multicyclic compound having a photoreactive group is included on a main chain thereof, thermal stability is excellent and photoreaction is fast, a liquid crystal alignment film produced using the composition, and a liquid crystal display including the liquid crystal alignment film. This application claims the benefit of the filing date of Korean Patent Application No. 10-2005-0005544, filed on Jan. 20, 2005, in the Korean Intellectual Property Office, the disclosure of which is incorporated herein in its entirety by reference.

BACKGROUND ART

Currently, liquid crystal displays are regarded as the most competitive display type, capable of replacing the Braun tube by virtue of its advantages of light weight and low power consumption. Particularly, in a thin-film transistor liquid crystal display (TFT-LCD) actuated using a thin-film transistor, the independently actuated pixels result in excellent response speed of the liquid crystal, which makes it possible to obtain high-definition moving picture; thus, the scope of its application has gradually expanded into notebook computers, wall-mounted TVs, and the like.

In production of a typical color thin film transistor-liquid crystal display, a thin-film transistor actuating device and an ITO transparent electrode are laminated on a glass substrate and an alignment film is subsequently layered thereon to form a lower plate of a cell. Spacers are formed on internal surfaces of a pair of upper and lower substrates using a sealant to inject the liquid crystal material therebetween. Polarized films are attached to external surfaces of the glass substrates. The liquid crystal material is injected and hardened between a pair of substrates to produce a liquid crystal display cell.

In the TFT-LCD, in order to use the liquid crystal as an optical switch, the liquid crystal must be initially aligned in a predetermined direction on a layer, in which the thin film tansistor is formed at an innermost portion of the display cell. For this, a liquid crystal alignment film is used.

A method of producing the alignment film is exemplified by a rubbing treatment method, in which a polymer resin film, such as a polyimide resin, formed on a substrate, is unidirectional rubbed using cloth and the like, or a method in which silicon dioxide ($SiO_2$) is inclinedly deposited. However, the alignment film produced using the rubbing treatment method has problems of contamination by impurities, reduction in yield of products due to static electricity, and degradation of contrast because of the contact during the rubbing. Additionally, the method using the inclined deposition is problematic in that production cost is high and it is unsuitable to apply to a large liquid crystal display because it is difficult to assure a large area.

In order to avoid these problems, an alignment method has been developed. The method comprises a non-rubbing process using an alignment material for photopolymerization in which light is radiated to cause photopolymerization so as to induce alignment of a polymer and thereby aligning the liquid crystal. A representative example of the non-rubbing processing is photoalignment caused by photopolymerization, which was announced by M. Schadt et al. (Jpn. J. Appl. Phys., Vol 31, 1992, 2155), Dae S. Kang, et al. (U.S. Pat. No. 5,464,669), and Yuriy Reznikov (Jpn. J. Appl. Phys. Vol. 34, 1995, L1000). The photoalignment has a mechanism in which photosensitive groups combined with the polymer, using linearly polarized ultraviolet rays, cause a photoreaction, and in this procedure a main chain of a polymer is aligned in a predetermined direction, and thereby aligning the liquid crystal.

Polycinnamate-based polymers, such as PVCN (poly(vinyl cinnamate)) and PVMC (poly(vinyl methoxycinnamate)), have been mainly used as a material of the alignment film for photopolymerization. However, these polymers are problematic in that thermal stability is poor even if photoalignment is excellent. In other words, thermal stability of the alignment film depends on thermal stability of the polymer, and thermal stability of the alignment film is poor because the poly(vinyl cinnamate)-based polymer generally has a glass transition temperature of 100° C. or less at a main chain thereof.

Meanwhile, Japanese Patent Laid-Open Publication No. Hei. 11-181127 discloses a method of producing a polymer-type alignment film, which includes a main chain, such as acrylate and methacrylate, and a side chain having a photosensitive group, such as a cinnamic acid group, and an alignment film produced using the method. However, it is disadvantageous in that since the polymer as disclosed in the above document has poor mobility, it is difficult to obtain desired alignment characteristics even though it is exposed to light for a long time. The reason for this is that the photosensitive group existing in the polymer is restricted by the main chain of the polymer, thus it is difficult for it to rapidly react to polarized light. Hence, as it takes a long time to form a network polymer, the processing efficiency is reduced. Additionally, if the alignment is conducted for an insufficient length of time, alignment of the liquid crystal of the resulting liquid crystal display is poor, thus, undesirably, dichroic ratio is small and contrast is degraded.

DISCLOSURE

Technical Problem

The present invention has been made keeping in mind the above problems occurring in the prior art, and an object of the present invention is to provide a composition for forming a liquid crystal alignment film in which thermal stability is excellent and photoreaction rate is improved.

Another object of the present invention is to provide a liquid crystal alignment film produced using the composition and a liquid crystal display including the liquid crystal alignment film.

Technical Solution

To accomplish the above objects, the present invention provides a composition for forming a liquid crystal alignment film, which comprises a polymer including a multicyclic compound having a photoreactive group on a main chain thereof.

Also, the present invention provides a method of producing a liquid crystal alignment film using the composition for forming the liquid crystal alignment film.

Furthermore, the present invention provides a liquid crystal alignment film produced using the composition for forming the liquid crystal alignment film.

Additionally, the present invention provides a liquid crystal display including the liquid crystal alignment film produced according to the present invention.

MODE FOR INVENTION

Figure 1:
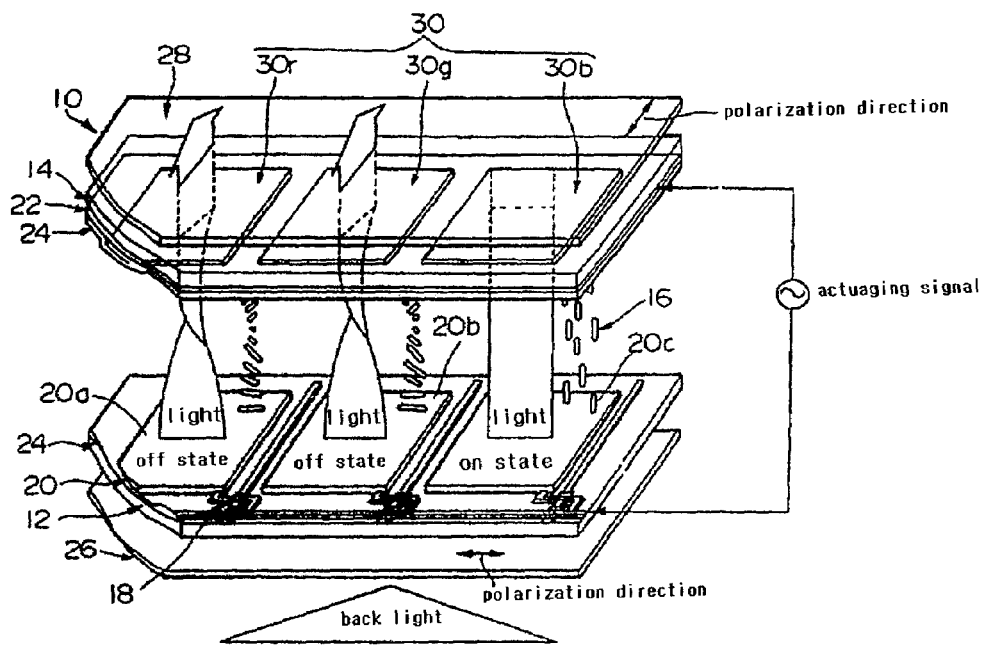
FIG. 1 illustrates a liquid crystal display according to the present invention.

Hereinafter, a detailed description will be given of the present invention.

In the present invention, since a polymer, which comprises a multicyclic compound having a photoreactive group on a main chain thereof, has the multicyclic compound on the main chain thereof, thermal stability is excellent due to a high glass transition temperature. Furthermore, since lattice vacancy is relatively large in the polymer, the photoreactive group is capable of moving relatively freely therein, thus it is possible to improve a slow photoreaction rate, which is considered a disadvantage of a conventional polymer material for forming a liquid crystal alignment film of a liquid crystal display.

In the present invention, the polymer including the multicyclic compound, having the photoreactive group on the main chain thereof, comprises a polymer produced by polymerizing a component for polymerization including the multicyclic compound having the photoreactive group shown in the following Formula 1. In connection with this, it is preferable that the degree of polymerization of the polymer be 50-5000.

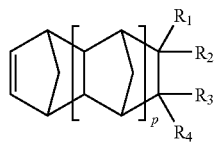

Formula 1

In Formula 1, p is an integer ranging from 0 to 4;

at least one of $R_1$, $R_2$, $R_3$ and $R_4$ is a radical selected from the group consisting of the following Formulae 1a, 1b, 1c, and 1d;

the balance of $R_1$, $R_2$, $R_3$ and $R_4$ is independently a group selected from the group consisting of hydrogen, halogens, substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, substituted or unsubstituted alkynyls having the number of carbon atoms of 2-20, and a non-hydrocarbonaceous polar group including at least one of oxygen, nitrogen, phosphorus, sulfur, silicon, and boron; or $R_1$ and $R_2$, or $R_3$ and $R_4$ may be connected to each other to form an alkylidene group having the number of carbon atoms of 1-10, or $R_1$ or $R_2$ may be connected to any one of $R_3$ and $R_4$ to form a saturated or unsaturated cyclo alkyl having the number of carbon atoms of 4-12 or an aryl having the number of carbon atoms of 6-24.

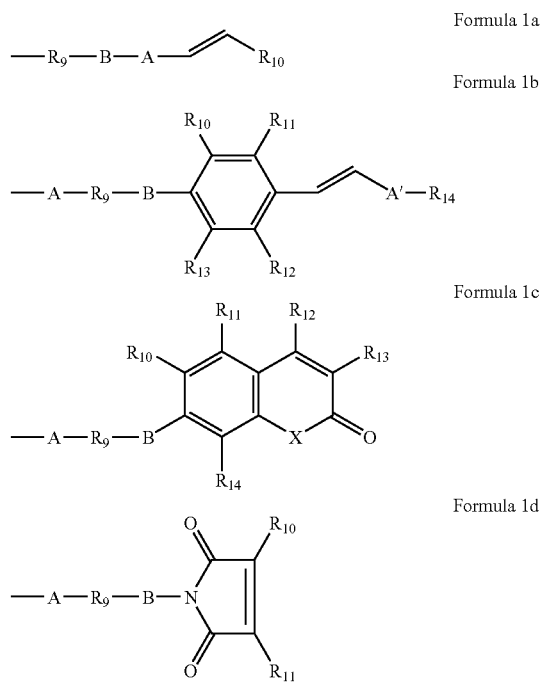

In the above Formulae 1a, 1b, 1c, and 1d,

A and A' is substituted or unsubstituted alkylenes having the number of carbon atoms of 1-20, carbonyl, carboxy, or substituted or unsubstituted arylenes having the number of carbon atoms of 6-40;

B is oxygen, sulfur, or —NH—;

X is oxygen or sulfur;

$R_9$ is a group selected from the group consisting of a simple bond, substituted or unsubstituted alkylenes having the number of carbon atoms of 1-20, substituted or unsubstituted alkenylenes having the number of carbon atoms of 2-20, substituted or unsubstituted saturated or unsaturated cycloalkylenes having the number of carbon atoms of 5-12, substituted or unsubstituted arylenes having the number of carbon atoms of 6-40, substituted or unsubstituted aralkylenes having the number of carbon atoms of 7-15, and substituted or unsubstituted alkynylenes having the number of carbon atoms of 2-20; and $R_{10}$, $R_{11}$, $R_{12}$, $R_{13}$, and $R_{14}$ are independently a group selected from the group consisting of substituted or unsubstituted alkyls having the number of carbon atoms of 1-20, substituted or unsubstituted alkoxys having the number of carbon atoms of 1-20, substituted or unsubstituted aryloxys having the number of carbon atoms of 6-30, and substituted or unsubstituted aryls having the number of carbon atoms of 6-40.

In Formula 1, it is preferable that the non-hydrocarbonaceous polar group be selected from the following functional groups.

—$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$, —$R_5C(=S)SR_6$, —$R_5SO_3R_6$, —$SO_3R_6$, —$R_5N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

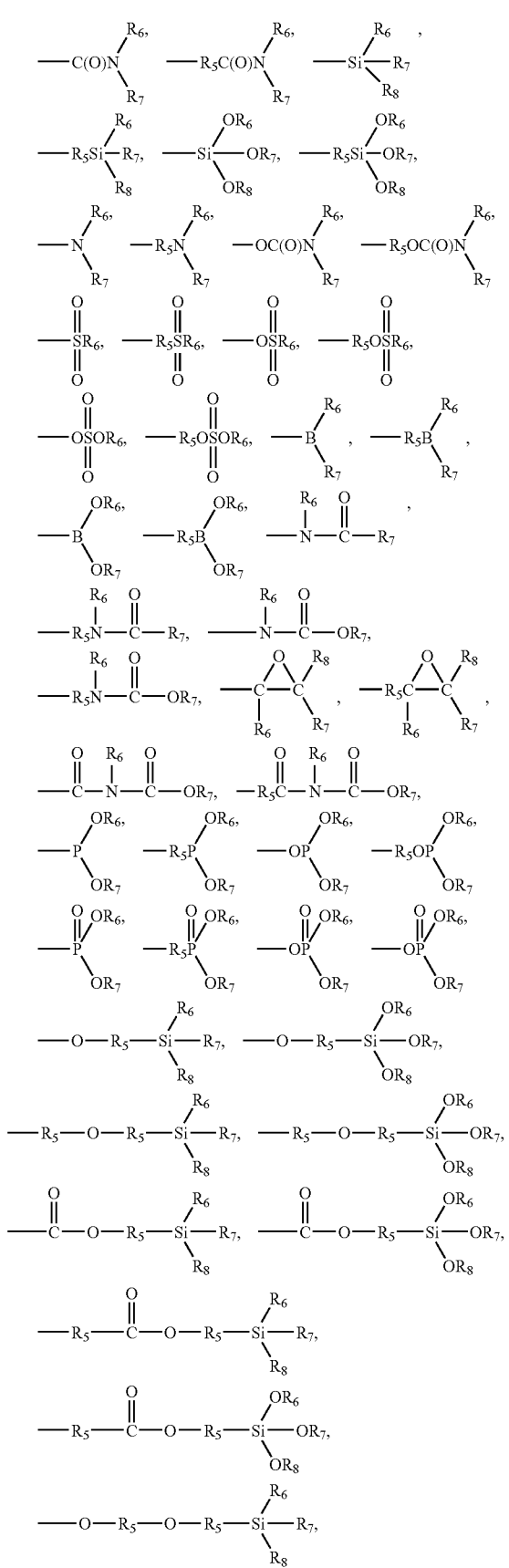
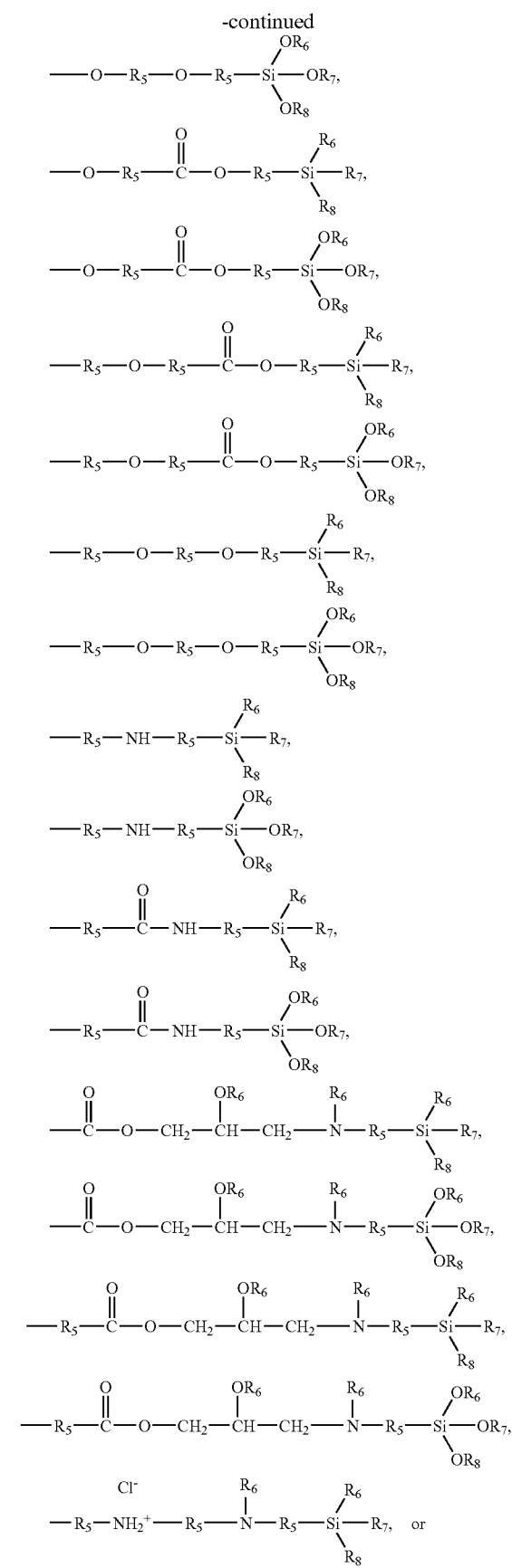

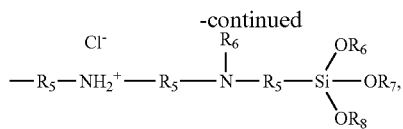

In the above examples of the non-hydrocarbonaceous polar group, each $R_5$ is selected from the group consisting of substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, and substituted or unsubstituted alkynyls having the number of carbon atoms of 2-20; and $R_6$, $R_7$, and $R_8$ are independently selected from the group consisting of hydrogen, halogens, substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, and substituted or unsubstituted alkynyls having the number of carbon atoms of 2-20.

In the present invention, the polymer, which is produced through polymerization of a component for polymerization including a multicyclic compound having a photoreactive group disclosed in the following Formula 1, may include a structural unit of the following Formula 2 or 3.

Formula 2

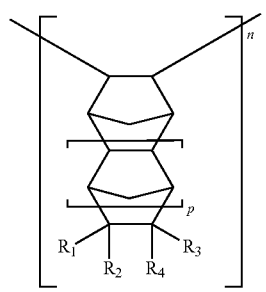

Formula 3

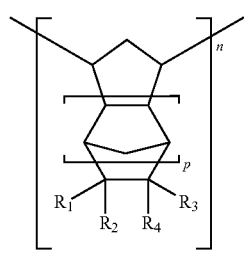

In the above Formulae 2 and 3, n is 50-5,000, and p, $R_1$, $R_2$, $R_3$, and $R_4$ are as defined in the above Formula 1.

In the present invention, a component for polymerization, which is used to produce the polymer including the multicyclic compound having the photoreactive group in a main chain thereof, may further include the compound of the following Formula 4, linear olefins, or mixtures thereof.

Formula 4

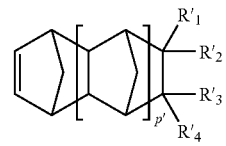

In the above Formula 4, p' is an integer ranging from 0 to 4;

$R'_1$, $R'_2$, $R'_3$, and $R'_4$ are independently a group selected from the group consisting of hydrogen, halogens, substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, substituted or unsubstituted alkynyls having the number of carbon atoms of 2-20, and a non-hydrocarbonaceous polar group including at least one of oxygen, nitrogen, phosphorus, sulfur, silicon, and boron; or $R'_1$ and $R'_2$, or $R'_3$ and $R'_4$ may be connected to each other to form an alkylidene group having the number of carbon atoms of 1-10, or $R'_1$ or $R'_2$ may be connected to any one of $R'_3$ and $R'_4$ to form a saturated or unsaturated cycloalkyl having the number of carbon atoms of 4-12 or an aryl having the number of carbon atoms of 6-24.

In the above Formula 4, it is preferable that the non-hydrocarbonaceous polar group be selected from the following functional groups.

—$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$, —$R_5C(=S)SR_6$, —$R_5SO_3R_6$, —$SO_3R_6$, —$R_5N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

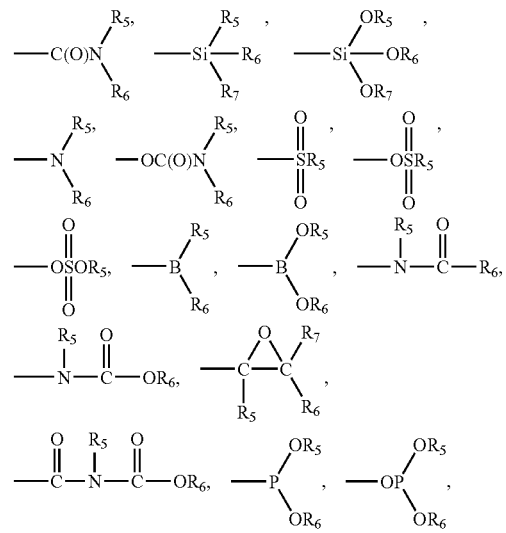

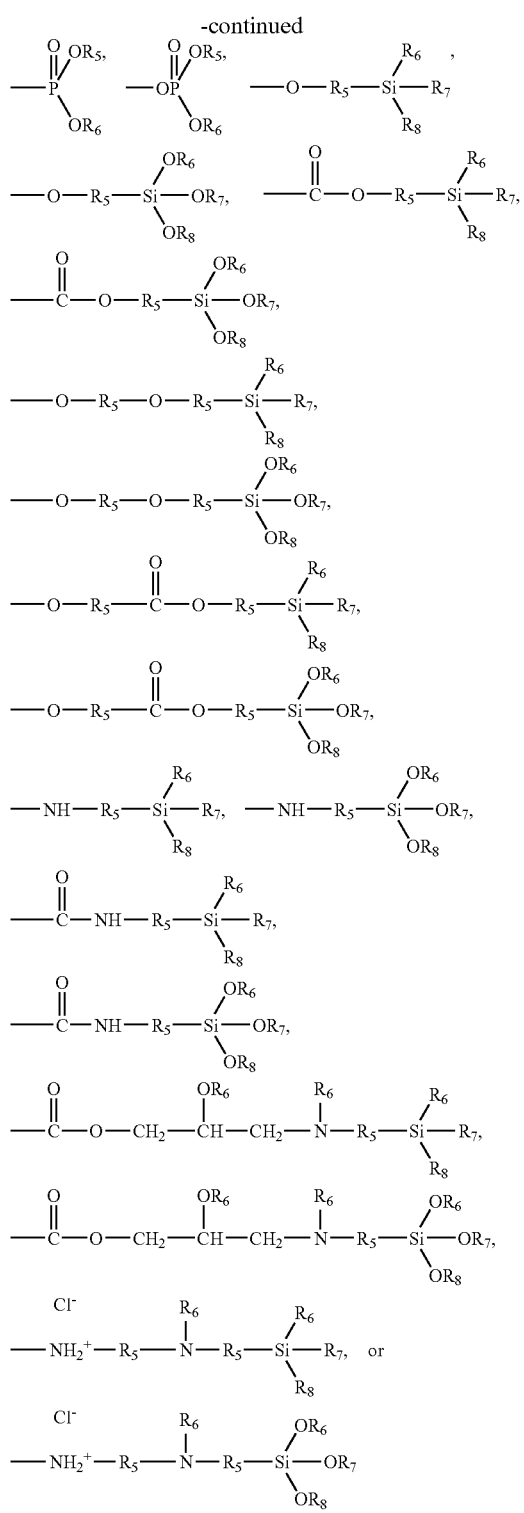

In the above examples of the non-hydrocarbonaceous polar group, each $R_5$ is selected from the group consisting of hydrogen, halogens, substituted or unsubstituted alkyls having the number of carbon atoms of 1-20, substituted or unsubstituted alkenyls having the number of carbon atoms of 2-20, substituted or unsubstituted saturated or unsatruated cycloalkyls having the number of carbon atoms of 5-12, substituted or unsubstituted aryls having the number of carbon atoms of 6-40, substituted or unsubstituted aralkyls having the number of carbon atoms of 7-15, and substituted or unsubstituted alkynyls having the number of carbon atoms of 2-20; and $R_6$, $R_7$, and $R_8$ are independently selected from the group consisting of hydrogen, halogens, substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, and substituted or unsubstituted alkynyls having the number of carbon atoms of 2-20.

A linear olefin, which may be additionally included in the component for polymerization, may be selected from the group consisting of α-olefins having the number of carbon atoms of 1 to 20, butadiene, and pentadiene.

If the linear olefin is the ethylene, the polymer, which includes the multicyclic compound having the photoreactive group in the main chain thereof according to the present invention, may contain a polymerization unit shown in the following Formula 5.

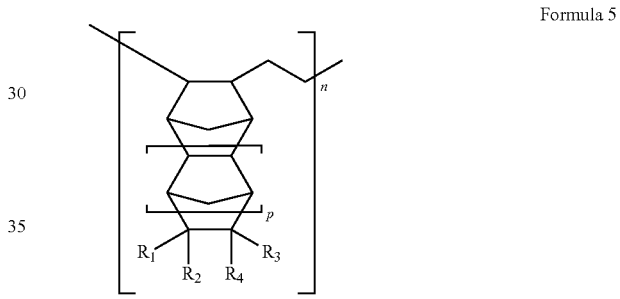

Formula 5

In the above Formula 5, $R_1$, $R_2$, $R_3$, $R_4$, and p are as defined in the above Formula 1, and n is 50-5,000.

Definitions of the above-mentioned substituent groups will be given in detail.

The term "alkyl" means a saturated monovalent hydrocarbon moiety which includes 1-20 carbon atoms, preferably 1-10 carbon atoms, and more preferably 1-6 carbon atoms and forms a straight chain or a branched chain. The alkyl group may be arbitrarily substituted with one or more halogen substituents. Examples of the alkyl group include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

The term "alkenyl" means a monovalent hydrocarbon moiety which has one or more carbon-carbon double bonds, includes 2-20 carbon atoms, preferably 2-10 carbon atoms, and more preferably 2-6 carbon atoms, and forms a straight chain or a branched chain. The alkenyl group may be combined with the above-mentioned chemical structures using the carbon atom having the carbon-carbon double bond or using the saturated carbon atom. The alkenyl group may be arbitrarily substituted with one or more halogen substituents. Examples of the alkenyl group include ethenyl, 1-propenyl, 2-propenyl, 2-butenyl, 3-butenyl, pentenyl, 5-hexenyl, dodecenyl, etc.

The term "cycloalkyl" means a saturated or unsaturated nonaromatic monovalent monocyclic, bicyclic, or tricyclic hydrocarbon moiety, which has 5-12 carbons as a ring member, and may be arbitrarily substituted with one or more halogen substituents. It is exemplified by cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (that is, bicyclo [2.2.1]hept-5-enyl), etc.

The term "aryl" means a monovalent monocyclic, bicyclic, or tricyclic aromatic hydrocarbon moiety which has 6-40 atoms as a ring member, preferably 6-20 atoms, and more preferably 6-12 atoms, and may be arbitrarily substituted with one or more halogen substituents. The aromatic moiety of the aryl group includes only the carbon atom. Examples of the aryl group include phenyl, naphthalenyl, fluorenyl, etc.

The term "aralkyl" means the above-mentioned alkyl group, one or more hydrogen atoms of which are substituted with the aryl group, and may be arbitrarily substituted with one or more halogen substituents. It is exemplified by benzyl, benzhydryl, trityl, etc.

The term "alkynyl" means a monovalent hydrocarbon moiety, which has one or more carbon-carbon triple bonds; includes 2-20 carbon atoms, preferably 2-10 carbon atoms, and more preferably 2-6 carbon atoms; and forms a straight chain or a branched chain. The alkynyl group may be combined with the above-mentioned chemical structures using the carbon atom having the carbon-carbon triple bond or using the saturated carbon atom. The alkynyl group may be arbitrarily substituted with one or more halogen substituents. Examples of the alkynyl group include ethynyl propynyl, etc.

The term "alkylene" means a saturated bivalent hydrocarbon moiety, which includes 1-20 carbon atoms, preferably 1-10 carbon atoms, and more preferably 1-6 carbon atoms, and forms a straight chain or a branched chain. The alkylene group may be arbitrarily substituted with one or more halogen substituents. Examples of the alkylene group include methylene, ethylene, propylene, butylene, hexylene, etc.

The term "alkenylene" means a bivalent hydrocarbon moiety, which has one or more carbon-carbon double bonds; includes 2-20 carbon atoms, preferably 2-10 carbon atoms, and more preferably 2-6 carbon atoms; and forms a straight chain or a branched chain. The alkenylene group may be combined with the above-mentioned chemical structures using the carbon atom having the carbon-carbon double bond or using the saturated carbon atom. The alkenylene group may be arbitrarily substituted with one or more halogen substituents.

The term "cycloalkylene" means a saturated or unsaturated nonaromatic bivalent monocyclic, bicyclic, or tricyclic hydrocarbon moiety, which has 5-12 carbons as a ring member, and may be arbitrarily substituted with one or more halogen substituents. It is exemplified by cyclopropylene, cyclobutylene, etc.

The term "arylene" means a bivalent monocyclic, bicyclic, or tricyclic aromatic hydrocarbon moiety, which has 6-40 atoms, preferably 6-20 atoms, and more preferably 6-12 atoms, as a ring member, and may be arbitrarily substituted with one or more halogen substituents. The aromatic moiety of the arylene group only includes the carbon atom. Examples of the arylene group include phenylene, etc.

The term "aralkylene" means a bivalent moiety in which one or more hydrogen atoms of the above-mentioned alkyl group are substituted with the aryl group and may be arbitrarily substituted with one or more halogen substituents. It is exemplified by benzylene, etc.

The term "alkynylene" means a bivalent hydrocarbon moiety, which has one or more carbon-carbon triple bonds; includes 2-20 carbon atoms, preferably 2-10 carbon atoms, and more preferably 2-6 carbon atoms; and forms a straight chain or a branched chain. The alkynylene group may be combined with the above-mentioned chemical structures using the carbon atom having the carbon-carbon triple bond or using the saturated carbon atom. The alkynylene group may be arbitrarily substituted with one or more halogen substituents. It is exemplified by ethynylene, propynylene, etc.

The term "bond" means a portion, which consists only of a bond but does not have any substituent group.

The polymer, which comprises the multicyclic compound including the photoreactive group on the main chain thereof, may be produced in the presence of a catalytic mixture of a precatalyst having a transition metal of the 10th group, a first co-catalyst for providing a Lewis base capable of weakly coordinating with metal of the precatalyst, and, optionally, a second co-catalyst for providing a compound containing a neutral electron donor ligand of the 15th group at a temperature of 10-200° C. If the reaction temperature is lower than 10° C., there is a problem in that activity of polymerization is very low. If the temperature is higher than 200° C., the catalyst is decomposed, which is an undesirably result.

It is preferable that the catalytic mixture comprise 1-1000 moles of the first co-catalyst for providing the Lewis base capable of weakly coordinating with metal of the precatalyst and, optionally, 1-1000 moles of the second co-catalyst for providing the compound containing the neutral electron donor ligand of the 15th group based on 1 mole of the precatalyst having transition metal of the 10th group. If the content of the first and second co-catalysts is less than 1 mole, there is a problem in that activation of the catalyst is not achieved. If the content is more than 1000 moles, the activity of the catalyst is low, which is an undesirably result.

A compound having the Lewis base functional group, which easily participates in a Lewis acid-base reaction to be separated from a core metal, may be used as the precatalyst having transition metal of the 10th group so that the base is easily separated by the first co-catalyst to convert the central transition metal into the catalytic active species. It is exemplified by [(Allyl)Pd(Cl)]$_2$ (Allylpalladium chloride dimer), (CH$_3$CO$_2$)$_2$Pd [Palladium(II)acetate], [CH$_3$COCH=C(O—)CH$_3$]$_2$Pd [Palladium(II) acetylacetonate], NiBr(NP(CH$_3$)$_3$)$_4$, or [PdCl(NB)O(CH$_3$)]$_2$.

Moreover, the first co-catalyst for providing the Lewis base capable of weakly coordinating with metal of the precatalyst may include a compound, which easily reacts with the Lewis base to form vacancies in the transition metal and which weakly coordinates with the transition metal compound, in order to stabilize the transition metal or another compound for providing this. It is exemplified by boranes, such as B(C$_6$F$_5$)$_3$, borates, such as dimethylanilinium tetrakis(pentafluorophenyl)borate, alkylaluminum, such as methylaluminoxane (MAO) or Al(C$_2$H$_5$)$_3$, and transition metal halides, such as AgSbF$_6$.

According to an embodiment of the present invention, the polymer including the multicyclic compound having the photoreactive group on the main chain thereof may be produced through the following procedure. First, the catalytic mixture is produced. The catalytic mixture comprises the precatalyst having a transition metal of the 10th group, the first co-catalyst for providing the Lewis base capable of weakly coordinating with metal of the precatalyst, and, optionally, the second co-catalyst for providing the compound containing the neutral electron donor ligand of the 15th group. Subsequently, a monomer solution including the compound of Formula 1 in the presence of an organic solvent and the catalytic mixture are subjected to additional polymerization. However, the order of addition of the catalyst, the monomer, and the solvent is not limited.

The liquid crystal alignment film according to the present invention may be produced using a method and a material known in the art, except that the polymer comprising the multicyclic compound including the photoreactive group of the present invention on the main chain thereof is used.

According to another embodiment of the present invention, a method of producing the liquid crystal alignment film according to the present invention comprises (a) applying a solution of a component for polymerization, which includes the above polymer having the multicyclic compound having the photoreactive group on the main chain thereof, on a substrate; (b) radiating polarized ultraviolet rays to form the alignment film; and, optionally, (c) annealing the alignment film at a temperature that is the same as or lower than the glass transition temperature of the alignment film. However, if necessary, the annealing step may be omitted.

In detail, the above-mentioned solution of a component for polymerization is applied on the substrate provided with transparent electrodes, and the solvent is removed to form the film. Subsequently, after the polarized ultraviolet rays, which are polarized in a predetermined direction, are radiated onto the resulting film to provide anisotropy to a surface of the film, the annealing is conducted at a temperature lower than the glass transition temperature of the alignment film to provide second alignment, thereby the liquid crystal alignment film is obtained. However, if necessary, the annealing step may be omitted.

The solvent used to dissolve the component for polymerization including the polymer, according to the present invention, is not limited as long as it is an organic solvent. It is exemplified by c-pentanone, chlorobenzene, N-methylpyrrolidone, dimethyl sulfoxide, dimethylformamide, toluene, chloroform, gamma-butyrolactone, tetrahydrofurane, etc.

Content of the polymer in the polymer solution depends on viscosity, volatility and the like, and is preferably 0.1-20 wt %, and more preferably 1-10 wt %. That is to say, the polymer solution is applied onto the surface of the substrate using a printing method, a spin coating method, or the like. Subsequently, it is dried to form a coat as a material of the alignment film. Therefore, if the content of the polymer is less than 0.1 wt %, thickness of the coat is excessively reduced, thus it may be impossible to reliably obtain the fair liquid crystal alignment film. If the content is more than 20 wt %, since the thickness of the coat is excessively increased, it is difficult to obtain a fair liquid crystal alignment film and viscosity of the solution increases, thus application characteristics are undesirably reduced.

The substrate is exemplified by a transparent substrate, which includes glass, such as float glass and typical glass, or a plastic film, such as polyethylene terephthalate, polybutylene terephthalate, polyethylene sulfone, and polycarbonates. A transparent conductive film is layered onto the substrate, and exemplified by an ITO film, a NESA film, etc.

The application of the solution, in which the photoreactive compound is dissolved, onto the substrate may be conducted using the spin coating method or the printing method, which is not limited. For example, the substrate may be coated to a thickness of 800-2000 Å by the solution to form the alignment film.

It is preferable that the alignment film applied onto the substrate be dried at 80-300° C. for 30 sec-60 min, and heating may be conducted at higher temperatures for a long time of 1 hour or more to remove the solvent if necessary.

Next, polarized ultraviolet rays, which are subjected to linear polarization, irradiate the surface thereof for about 0.5 sec-60 min using a UV lamp having intensity of about 1-1000 mW/cm$^2$ and a polarizer to cause dimerization in a photoreactor, thereby first molecular alignment is achieved. If necessary, annealing is conducted at a temperature lower than the glass transition temperature of the alignment film, or exposure is additionally conducted to achieve second molecular alignment. This method is capable of being applied to all polymers having a cinnamate group, a chalcone group, a coumarin group, or a maleimide group.

In the present invention, when the annealing is conducted, it is preferable that an annealing temperature be 25-300° C. If the annealing temperature is higher than 300° C., heat deformation may occur, which is an undesirable result. If necessary, the annealing may be omitted.

In the method of producing the liquid crystal alignment film according to the present invention, it is preferable that annealing time be 0 sec-60 min. If the time is more than 60 min, heat deformation may occur, which is undesirably. If necessary, the annealing may be omitted.

A liquid crystal display according to the present invention is characterized in that it comprises the above-mentioned liquid crystal alignment film of the present invention. The liquid crystal display according to the present invention may have a structure known in the art with the exception of the above liquid crystal alignment film.

FIG. 1 illustrates the liquid crystal display according to the present invention. Referring to FIG. 1, a color liquid crystal display device 10 according to the present invention comprises a pair of substrates 12, 14 facing each other, a liquid crystal 16 filled therebetween, a liquid crystal actuating device 18 formed on one substrate 12, transparent electrodes (pixel electrodes) 20a, 20b, 20c connected to the liquid crystal actuating device 18, an opposition electrode 22 which is formed on the other substrate 14 so as to face the transparent electrode 20, an alignment film 24 supporting the liquid crystal 16, polarization filters (the lower polarization filter 26 and the upper polarization filter 28) formed on a pair of substrates 12, 14, and color filters 30r, 30g, 30b formed on the substrate 14.

A typical substrate for the liquid crystal display may be used as the substrates 12, 14, and various materials, such as ceramic materials, may be used in addition to the glass substrate. Furthermore, any shape may be used as long as it corresponds to a liquid crystal display device to be commercialized. For example, a predetermined shape, such as a planar rectangular shape, may be used.

The liquid crystal 16 changes the alignment state of molecules through application of voltage. For example, in the case of the TN (twisted nematic)-type liquid crystal as shown in FIG. 1, if voltage is not applied, rows of the molecules are twisted at an angle of 90°. But the rows are straightened by application of voltage, thereby twisting is avoided. Additionally, a spacer, which is not shown in FIG. 1 and consists of corpuscles and the like, is interposed between both alignment films (24, 24), and the interval in which the liquid crystal is to be filled is constantly maintained by the spacer.

A thin film transistor (TFT) may be used as the liquid crystal actuating device 18. The liquid crystal actuating device 18 functions to control voltage applied to the liquid crystal using an actuating signal.

The transparent electrode 20 forms one pair in conjunction with the opposition electrode 22 formed on the other substrate 14, and serves to apply voltage from the liquid crystal actuating device 18 to the liquid crystal 16. Generally, an ITO film and the like may be used. The liquid crystal actuating device 18 and the transparent electrodes 20a, 20b, 20c are provided in every pixel. However, the opposition electrode 22 generally may act as a common electrode for every pixel.

The polarization filters 26, 28 are films having the function of radiating linear polarized light. In the liquid crystal display device 10 shown in FIG. 1, the lower filter 26 and the upper filter 28 formed on the substrates 12, 14 are provided so that their polarization directions are at right angles.

The color filter 30 is used in the color liquid crystal display device, and the color filters, having three colors: red, green, and blue colors, forms one set for each pixel. In the color liquid crystal display device, it is possible to obtain various colors through combination of the above-mentioned 3 colors.

A better understanding of the present invention may be obtained through the following examples, which are set forth to illustrate, but are not to be construed as the limit of the present invention.

In the examples as described below, all operations for handling compounds which were sensitive to air or water were conducted using a standard Schlenk technique or a dry box technique. A nuclear magnetic resonance (NMR) spectrum was obtained using a Bruker 300 spectrometer. In connection with this, $^1$H NMR was measured at 300 MHz and $^{13}$C NMR was measured at 75 MHz. A molecular weight and a molecular weight distribution of a polymer were measured using GPC (gel permeation chromatography). In connection with this, a polystyrene sample was used as a standard.

Toluene was distilled in potassium/benzophenone to be purified, and dichloromethane was distilled in $CaH_2$ to be purified.

SYNTHESIS EXAMPLE 1

1-(1) Synthesis of Monomer

Synthesis of 5-norbornene-2-methanol

After DCPD (dicyclopentadiene, Aldrich, 397 g, 3 mol) and allyl alcohol (Aldrich, 331 g, and 5.7 mol) were put into a 2 L high pressure reactor, temperature was increased to 210° C. After a reaction was conducted for 1 hour while agitating at 300 rpm, reactants were cooled and moved to a distillator. Distillation was repeatedly conducted under reduced pressure of 1 torr using a vacuum pump twice to obtain a product at 56° C. (yield: 52%)

$^1$H-NMR (300 MHz, $CDCl_3$): δ 6.17~5.91 (m, 2H), 3.71~3.19 (m, 2H), 2.91~2.75 (m, 2H), 2.38 (m, 1H), 1.83 (m, 1H), 1.60~1.12 (m, 2H), 0.52 (m, 1H)

Synthesis of 5-norbornene-2-methylcinnamate

After 5-norbornene-2-methanol (15 g, 0.121 mol), which was synthesized as described above, triethylamine (Aldrich, 61.2 g, 0.605 mol), and 20 ml of THF were put into a 250 ml two-neck flask, agitation was conducted in an ice-water bath at 0° C. Cinnamoyl chloride (22.1 g, 0.133 mol) was dissolved in 60 ml THF, and then slowly added to the reactants using an additional flask. After 10 min, the reactants were heated to room temperature, and agitation was conducted for an additional time of 1 hour. The solution was diluted using ethyl acetate, moved to a separatory funnel, washed with water and $NaHCO_3$ a few times, and distilled under reduced pressure to remove the solvent. Purification was conducted using column chromatography (hexane:ethyl acetate=20:1) to obtain a product. (yield: 88%)

$^1$H-NMR (300 MHz, $CDCl_3$): δ 7.71~7.66 (dd, 1H), 7.53~7.36 (m, 5H), 6.49~6.42 (dd, 1H), 6.17~5.98 (m, 2H), 4.10~3.76 (m, 2H), 2.94~2.75 (m, 2H), 2.45 (m, 1H), 1.91~1.83 (m, 1H), 1.48~1.16 (m, 2H), 0.59 (m, 1H)

1-(2) Synthesis of Polymer

Polymerization of 5-norbornene-2-methylcinnamate 5 g of 5-norbornene-2-methylcinnamate (19.66 mmol) as a monomer and 5 Ml of purified toluene as a solvent were fed into a 250 Ml Schlenk flask. 0.88 mg of $(CH_3CO_2)_2Pd$ and 1.1 mg of tricyclohexylphosphine, which were dissolved in 1 Ml of dichloromethane, as a catalyst, and 6.3 mg of dimethylanilinium tetrakis(pentafluorophenyl)borate as a co-catalyst were added to the flask, and a reaction was conducted while agitating at 40° C. for 18 hours.

After the reaction was conducted for 18 hours, the reactants were put into an excessive amount of ethanol to produce a white polymer precipitate. The precipitate was filtered using a glass funnel to collect the polymer, and the collected polymer was dried in a vacuum oven at 65° C. for 24 hours to produce 1.6 g of the norbornene methylcinnamate polymer (Mw=703,000, PDI=2.0, yield=32%).

SYNTHESIS EXAMPLE 2

2-(1) Synthesis of Monomer

Synthesis of 4-hydroxy methylcinnamate

After 4-hydroxy cinnamic acid (Aldrich, 20 g, 0.122 mol) was dissolved in 120 ml of methanol, 2 ml of a sulfuric acid was added thereto. After a reflux was conducted at 65° C. for 5 hours, reactants were cooled and pressure was reduced to remove excess methanol. A red solid was obtained. It was extracted with a great quantity of ethyl acetate, washed with $NaHCO_3$ and $H_2O$, dried with anhydrous $MgSO_4$, and filtered, and the solvent was removed using a rotary evaporator, thereby a red solid product was obtained. Yield: 20.63 g (95%)

$^1$H-NMR (400 MHz, acetone $d_6$): δ 7.58~7.62s (d, 1H), 7.53~7.55(dd, 2H), 6.88~6.91(dd, 2H), 6.32~6.36 (d, 1H), 3.70(s, 3H)

Synthesis of (methylcinnamate)-5-norbornene-2-carboxylate

A norbornene carboxyl acid (Aldrich, 11 g, 79.64 mmol), 4-hydroxy methylcinnamate (12.9 g, 72.4 mmol), which was synthesized as described above, EDC [1-(3-Dimethylaminopropyl)-3-ethylcarbodiimide hydrochloride] (Aldrich, 22.2 g, 115.84 mmol), and HOBT (1-Hydroxybenzotriazole hydrate) (Aldrich, 14.7 g, 108.6 mmol) were put into a 250 ml two-neck flask, and then dissolved in 100 ml of DMF. After the temperature was reduced to 0° C., triethylamine (Aldrich, 50 ml, 362 mmol) was slowly dropped thereupon. When the reaction was completed, 3 hours after the temperature was increased to room temperature, extraction was conducted, with a great quantity of ethyl acetate. Washing was conducted using $NaHCO_3$ and $H_2O$ a few times, drying was conducted using anhydrous $MgSO_4$, filtration was conducted, and the remove of the solvent was conducted using a rotary evaporator, thereby a yellow solid product was obtained. Purification was conducted using column chromatography (hexane:ethyl acetate=6:1) to create a pure product. (yield: 60%)

$^1$H-NMR (300 MHz, $CDCl_3$): δ 7.64~7.69 (dd, 1H), 7.50~7.53 (dd, 2H), 7.05~7.14 (dd, 2H), 6.36~6.43 (dd, 1H), 6.06~6.27 (m, 2H), 3.80 (s, 3H), 2.99~3.39 (m, 3H), 2.01 (m, 1H), 1.35~1.60 (m, 3H)

2-(2) Synthesis of Polymer

Polymerization of (methylcinnamate)-5-norbornene-2-carboxylate 3 g of (methylcinnamate)-5-norbornene-2-carboxylate (10.06 mmol) as a monomer and 7 Ml of purified toluene as a solvent were fed into a 250 Ml Schlenk flask. 0.98 mg of $(CH_3CO_2)_2Pd$ and 1.13 mg of tricyclohexylphosphine, which were dissolved in 1 Ml of dichloromethane, as a catalyst, and 6.4 mg of dimethylanilinium tetrakis(pentafluorophenyl)borate as a co-catalyst were added to the flask, and a reaction was conducted while agitating at 90° C. for 5 hours.

After the reaction was conducted for 5 hours, the reactants were put into an excessive amount of ethanol to produce a white polymer precipitate. The precipitate was filtered using a glass funnel to collect the polymer, and the collected polymer was dried in a vacuum oven at 65° C. for 24 hours to produce 1.36 g of the (methylcinnamate)-5-norbornene-2-carboxylate polymer (Mw=289,000, PDI=2.76, yield=45%).

SYNTHESIS EXAMPLE 3

3-(1) Synthesis of Monomer

Synthesis of 6-(4-oxy methyl cinnamate)hexanol 4-hydroxy methyl cinnamate (8 g, 44.9 mmol), synthesized as described above, $NaOCH_3$ (Aldrich, 2.4 g, 44.9 mmol), and NaI (270 mg, catalytic quantity) were put into a 250 ml two-neck flask, and then dissolved in 100 ml dimethylacetamide. After agitation was conducted for 1 hour, chlorohexanol (Aldrich, 6 ml, 44.9 mmol) was added thereto, and a reflux was conducted at 100° C. for 2 days. Once the reaction was completed, it was cooled to room temperature, and the solvent was removed. Subsequently, the resulting solid was dissolved in an excessive amount of methanol to remove an undissolved solid portion, and pressure was reduced to remove the solvent; thereby 8.4 g of a white solid product was obtained (yield: 67.2%).

$^1$H-NMR (400 MHz, $CDCl_3$): δ 7.64~7.68 (d, 1H), 7.48~7.49 (dd, 2H), 6.89~6.91 (dd, 2H), 6.30~6.34 (d, 1H), 3.98~4.02 (t, 2H), 3.81 (s, 3H), 3.67~3.70 (t, 2H), 1.46~1.84 (m, 8H)

Synthesis of 6-(4-oxy methyl cinnamate)hexyl-5-norbornene-2-carboxylate

A norbornene carboxyl acid (Aldrich, 5 g, 36.22 mmol), 6-(4-oxy methyl cinnamate)hexanol (8.4 g, 30.18 mmol), synthesized as described above, EDC (Aldrich, 9.26 g, 48.29 mmol), and HOBT (Aldrich, 6.12 g, 45.27 mmol) were put into a 250 ml two-neck flask, and then dissolved in 70 ml of DMF. After the temperature was reduced to 0° C., triethylamine (Aldrich, 21 ml, 150.9 mmol) was slowly dropped thereupon. When the reaction was completed, one night after the temperature was increased to room temperature, extraction was conducted with a great quantity of ethyl acetate. Washing was conducted using $NaHCO_3$ and $H_2O$, drying was conducted using anhydrous $MgSO_4$, filtration was conducted, and the removal of the solvent was conducted using a rotary evaporator; thereby a yellow liquid product was obtained. Purification was conducted using column chromatography (hexane:ethyl acetate=7:1) to obtain a pure product. (yield: 70%)

$^1$H-NMR (400 MHz, $CDCl_3$): δ 7.65~7.69 (d, 1H), 7.47~7.49 (dd, 2H), 6.90~6.92 (dd, 2H), 6.31~6.35 (d, 1H), 5.93~6.22 (m, 2H), 3.99~4.05 (tt, 4H), 3.81 (s, 3H), 2.92~3.22 (m, 3H), 2.19 (m, 1H), 1.28~1.85 (m, 11H)

3-(2) Synthesis of Polymer

Polymerization of 6-(4-oxy methyl cinnamate)hexyl-5-norbornene-2-carboxylate 5 g of 6-(4-oxy methyl cinnamate)hexyl-5-norbornene-2-carboxylate (12.55 mmol) as a monomer and 5 Ml of purified toluene as a solvent were fed into a 250 Ml Schlenk flask. 5.6 mg of $(CH_3CO_2)_2Pd$ and 7 mg of tricyclohexylphosphine, which were dissolved in 2 Ml of dichloromethane as a catalyst, and 40.2 mg of dimethylanilinium tetrakis(pentafluorophenyl)borate as a co-catalyst, were added to the flask, and a reaction was conducted while agitating at 90° C. for 18 hours.

After the reaction was conducted for 18 hours, the reactants were put into an excessive amount of ethanol to produce a white polymer precipitate. The precipitate was filtered using a glass funnel to collect the polymer, and the collected polymer was dried in a vacuum oven at 65° C. for 24 hours to produce 1.6 g of the norbornene methylcinnamate polymer (yield=32%).

SYNTHESIS EXAMPLE 4

4-(1) Synthesis of Monomer

Synthesis of 5-norbornene-2-chalcone ester

A norbornene acid (Aldrich, 11 g, 79.64 mmol), 2-hydroxy chalcone (16.2 g, 72.4 mmol), EDC (Aldrich, 22.2 g, 115.84 mmol), and HOBT (Aldrich, 14.7 g, 108.6 mmol) were put into a 250 ml two-neck flask, and then dissolved in 100 ml of DMF. After the temperature was reduced to 0° C., triethylamine (Aldrich, 50 ml, 362 mmol) was slowly dropped thereupon. When the reaction was completed, one night after the temperature was increased to room temperature, extraction was conducted with the great quantity of ethyl acetate. Washing was conducted using $NaHCO_3$ and $H_2O$, drying was conducted using anhydrous $MgSO_4$, filtration was conducted, and the removal of the solvent was conducted using a rotary evaporator, thereby obtaining a product. Purification was conducted using column chromatography (hexane:ethyl acetate=20:1) to obtain a pure product (yield: 80%).

4-(2) Synthesis of Polymer

Polymerization of 5-norbornene-2-chalcone ester 4.3 g of 5-norbornene-2-chalcone ester (12.5 mmol) as a monomer and 10 Ml of purified toluene as a solvent were fed into a 250 Ml Schlenk flask. 5.6 mg of $(CH_3CO_2)_2Pd$ and 7 mg of tricyclohexylphosphine, which were dissolved in 1 Ml of dichloromethane, as a catalyst, and 40.2 mg of dimethylanilinium tetrakis(pentafluorophenyl)borate as a co-catalyst were added to the flask, and a reaction was conducted while agitating at 90° C. for 18 hours.

After the reaction was conducted for 18 hours, the reactants were put into an excessive amount of ethanol to produce a white polymer precipitate. The precipitate was filtered using a glass funnel to collect the polymer, and the collected polymer was dried in a vacuum oven at 70° C. for 24 hours to produce 3 g of the norbornene-2-chalcone ester polymer (yield=70%).

SYNTHESIS EXAMPLE 5

5-(1) Synthesis of Monomer

Synthesis of 5-norbornene-2-coumarin ester

A norbornene acid (Aldrich, 11 g, 79.64 mmol), 7-hydroxycourmarin (11.7 g, 72.4 mmol), EDC (Aldrich, 22.2 g, 115.84 mmol), and HOBT (Aldrich, 14.7 g, 108.6 mmol) were put into a 250 ml two-neck flask, and then dissolved in 100 ml of DMF. After the temperature was reduced to 0° C., triethylamine (Aldrich, 50 ml, 362 mmol) was slowly dropped thereupon. When the reaction was completed, one night after the temperature was increased to room temperature, extraction was conducted with a great quantity of ethyl acetate. Washing was conducted using $NaHCO_3$ and $H_2O$, drying was conducted using anhydrous $MgSO_4$, filtration was conducted, and the remove of the solvent was conducted using a rotary evaporator, thereby a product was obtained. Recrystallization was conducted using hexane/ethanol to obtain a pure product (yield: 70%).

5-(2) Synthesis of Polymer

Polymerization of 5-norbornene-2-coumarin ester 3.5 g of 5-norbornene-2-coumarin ester (12.5 mmol) as a monomer and 7 Ml of purified toluene as a solvent were fed into a 250 Ml Schlenk flask. 5.6 Ml of $(CH_3CO_2)_2Pd$ and 7 mg of tricyclohexylphosphine, which were dissolved in 1 Ml of dichloromethane as a catalyst, and 40.2 mg of dimethylanilinium tetrakis(pentafluorophenyl)borate as a co-catalyst, were added to the flask, and a reaction was conducted while agitating at 90° C. for 18 hours.

After the reaction was conducted for 18 hours, the reactants were put into an excessive amount of ethanol to produce a white polymer precipitate. The precipitate was filtered using a glass funnel to collect the polymer, and the collected polymer was dried in a vacuum oven at 70° C. for 24 hours to produce 2 g of the norbornene-2-coumarin ester polymer (yield=57%).

SYNTHESIS EXAMPLE 6

6-(1) Synthesis of Monomer

Synthesis of 5-norbornene-2-maleimide ester

A norbornene acid (Aldrich, 11 g, 79.64 mmol), N-hydroxy maleimide (8.2 g, 72.4 mmol), EDC (Aldrich, 22.2 g, 115.84 mmol), and HOBT (Aldrich, 14.7 g, 108.6 mmol) were put into a 250 ml two-neck flask, and then dissolved in 100 ml of DMF. After the temperature was reduced to 0° C., triethylamine (Aldrich, 50 ml, 362 mmol) was slowly dropped thereupon. When the reaction was completed, one night after the temperature was increased to room temperature, extraction was conducted with a great quantity of ethyl acetate. Washing was conducted using $NaHCO_3$ and $H_2O$, drying was conducted using anhydrous $MgSO_4$, filtration was conducted, and the removal of the solvent was conducted using a rotary evaporator, thereby obtaining a product. Recrystallization was conducted using hexane/ethanol to obtain a pure product (yield: 70%).

6-(2) Synthesis of Polymer

Polymerization of 5-norbornene-2-maleimide ester 2.9 g of 5-norbornene-2-maleimide ester (12.5 mmol) as a monomer and 6 Ml of purified toluene as a solvent were fed into a 250 Ml Schlenk flask. 5 mg of $(CH_3CO_2)_2Pd$ and 7 mg of tricyclohexylphosphine, which were dissolved in 0.5 Ml of dichloromethane as a catalyst, and 40.2 mg of dimethylanilinium tetrakis(pentafluorophenyl)borate as a co-catalyst, were added to the flask, and a reaction was conducted while agitating at 90° C. for 18 hours.

After the reaction was conducted for 18 hours, the reactants were put into an excessive amount of ethanol to produce a white polymer precipitate. The precipitate was filtered using a glass funnel to collect the polymer, and the collected polymer was dried in a vacuum oven at 70° C. for 24 hours to produce 1.5 g of the norbornene-2-maleimide ester polymer (yield=52%).

Production of Alignment Film

EXAMPLE 1

The norbornene methylcinnamate polymer, which was produced in synthesis example 1, was dissolved in c-pentanone as a solvent to a concentration of 2 wt %, and applied on a quartz substrate using a spin coating method at 4500 rpm to produce a film.

The film was heated in an oven at 120° C. for 10 min to remove the solvent therefrom, exposure was conducted using a high pressure mercury lamp having intensity of 200 $mW/cm^2$ as a light source, and UV, which was polarized using a Glan-Laser polarizer manufactured by Meadowlark Corp., was radiated onto the film applied on the quartz substrate. The radiation was conducted for 5 sec. Heating was conducted at 80° C. for 10 sec to achieve annealing, thereby improving the alignment of molecules.

EXAMPLE 2

The procedure of example 1 was repeated, except that the polymer produced in synthesis example 2 was used instead of the polymer produced in synthesis example 1.

EXAMPLE 3

The procedure of example 1 was repeated, except that the polymer produced in synthesis example 3 was used instead of the polymer produced in synthesis example 1.

EXAMPLE 4

The procedure of example 1 was repeated, except that the polymer produced in synthesis example 4 was used instead of the polymer produced in synthesis example 1.

EXAMPLE 5

The procedure of example 1 was repeated, except that the polymer produced in synthesis example 5 was used instead of the polymer produced in synthesis example 1.

EXAMPLE 6

The procedure of example 1 was repeated, except that the polymer produced in synthesis example 6 was used instead of the polymer produced in synthesis example 1.

COMPARATIVE EXAMPLE 1

The procedure of example 1 was repeated to produce an alignment film, except that a compound of the following formula was used instead of 5-norbornene-2-methylcinnamate.

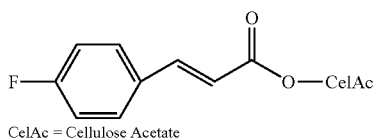

CelAc = Cellulose Acetate

COMPARATIVE EXAMPLE 2

The procedure of example 1 was repeated to produce an alignment film, except that a compound of the following formula was used instead of 5-norbornene-2-methylcinnamate.

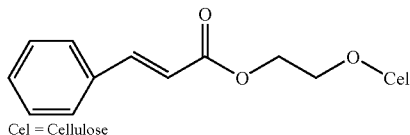

Cel = Cellulose

COMPARATIVE EXAMPLE 3

The procedure of example 1 was repeated to produce an alignment film, except that a compound of the following formula was used instead of 5-norbornene-2-methylcinnamate.

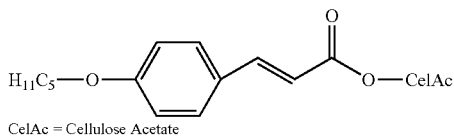

CelAc = Cellulose Acetate

EXPERIMENTAL EXAMPLE 1

Evaluation of Photoreactivity—FT-IR Spectrum

In order to evaluate photoreactivity of the alignment film, FT-IR spectra of the liquid crystal alignment films, which were produced in examples 1 to 6 and comparative examples 1 to 3, were observed. Evaluation was comparatively conducted in terms of time ($t_{1/2}$) required until intensity of stretching mode of a C=C bond in Formulae 1a to 1d of the polymer was reduced to a half of an early value depending on exposure (mercury lamp having intensity of 20 mW/cm² was used) and of a reduced energy value thereof ($E_{1/2}$=20 mW/cm²×$t_{1/2}$). The results are described in the following Table 1.

From comparison of results of $t_{1/2}$, it can be seen that it was reduced by about 1/20–1/4 in examples 1-6 in comparison with the comparative examples, thereby it could be confirmed that a photoreaction rate of the liquid crystal alignment film according to the present invention was excellent.

TABLE 1

|  | $t_{1/2}$ (min) | $E_{1/2}$ (J/cm²) |
|---|---|---|
| Example 1 | 1.0 | 1.2 |
| Example 2 | 1.1 | 1.3 |
| Example 3 | 1.0 | 1.2 |
| Example 4 | 1.2 | 1.4 |
| Example 5 | 1.0 | 1.2 |
| Example 6 | 1.3 | 1.6 |
| Comparative example 1 | 20.1 | 24.1 |
| Comparative example 2 | 9.3 | 11.2 |
| Comparative example 3 | 4.5 | 5.4 |

Evaluation of Thermal Stability—Data Observed Using an Optical Microscope

Figure 2:
FIG. 2 illustrates optical microscopic pictures showing the alignment of liquid crystals of examples 1 to 6 and comparative examples 1 to 3 according to the present invention.

In order to evaluate thermal stability of the alignment film, the liquid crystal alignment films, which were produced in examples 1-6 and comparative examples 1-3, were heated at 100, 150, and 180° C. for each 10 min. Simple liquid crystal cells (cell interval: about 5 μm) were produced using the alignment films, temperatures of which were changed and were not changed, and alignment of the liquid crystal was observed using a polarization microscope. The results were classified into high, average and low levels, and are shown in FIG. 2 in conjunction with pictures. In the production of the liquid crystal cell, two substrates suffering the same thermal hysteresis were arranged so that the alignment films faced inward, and polarization directions in the upper and lower substrates were parallel to each other upon radiation.

Referring to FIG. 2, in the case of comparative examples 1-3, white dots or lines were observed through the polarization microscope. The reason is that, in the alignment film having poor thermal stability, the arrangement of molecules was locally randomly changed due to heat, thus the liquid crystal was not undesirably arranged at a position in which the arrangement of molecules was randomly changed. On the other hand, in the case of examples 1-6, arrangement of the liquid crystal was constant even though the temperature increased to 100-180° C.

Generally, thermal stability in photoalignment is known to depend on two factors.

The first is the stability of a film, which relates to deterioration (decomposition, flow) of a polymer. This can be minimized by using a polymer having a Tg higher than the processing temperature.

The second is the stability of an alignment state, which relates to performance of the photoalignment film on the panel. This pertains to the degree that anisotropy, that is, an alignment characteristic of the liquid crystal in a predetermined direction, is maintained when heat is applied. In connection with this, the anisotropy is caused by dimers formed through a reaction of a photoreactive group exposed to polarized rays. If the photoreaction progresses relatively farther for the same exposure amount, the probability that the functional group photoreacted remains neither decomposes nor rearranges upon heating is increased. Thus, reduction in alignment ability of the liquid crystal can be avoided. With respect to performance of the photoalignment film, alignment stability to heat is an important factor, and comparison of the above-mentioned characteristics is conducted by confirming the degree that the photoreaction causing photoalignment when UV having the same energy is radiated for the same time is achieved.

The evaluation results of thermal stability of the examples and the comparative examples will be described, referring to the above-mentioned two factors.

That is to say, with respect to stability of the film, norbornene, cellulose, and cellulose acetate, which were used as a material of the alignment film in the examples and the comparative examples, all have a Tg of 180° C. or higher, which is higher than the processing temperature. Therefore, they all ensure desirable stability of the film.

As to stability of the alignment state, as shown in evaluation of the photoreactivity, the liquid crystal alignment films of examples 1-6 have a better photoreaction rate than those of comparative examples 1-3. Therefore, the photoreaction progresses relatively farther for the same exposure amount, thus stability of the alignment state to heat is desirably maintained.

Accordingly, the liquid crystal alignment film of the present invention is excellent in views of the stability of the film and stability of the alignment state, thereby it can be confirmed that it has high thermal stability.

INDUSTRIAL APPLICABILITY

According to the present invention, since production is conducted using a polymer including a multicyclic compound having a high glass transition temperature on a main chain thereof, thermal stability is excellent. Furthermore, since a lattice vacancy is relatively large in the polymer, a photoreactive group is capable of relatively freely moving in the main chain of the polymer, thus it is possible to provide a liquid crystal alignment film having an improved photoreaction rate.

The invention claimed is:

1. A composition for forming a liquid crystal alignment film, which comprises a polymer produced by polymerizing a component for polymerization including the compound shown in the following Formula 1:

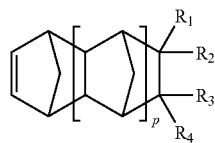

Formula 1 in the Formula 1, p is an integer ranging from 0 to 4;

at least one of $R_1$, $R_2$, $R_3$ and $R_4$ is a radical selected from the group consisting of the following Formulae 1a, 1b, 1c, and 1d;

the balance of $R_1$, $R_2$, $R_3$ and $R_4$ is independently a group selected from the group consisting of hydrogen, halogens, substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, substituted or unsubstituted alkynyls having the number of carbon atoms of 2-20, and a non-hydrocarbonaceous polar group including at least one of oxygen, nitrogen, phosphorus, sulfur, silicon, and boron; or $R_1$ and $R_2$, or $R_3$ and $R_4$ may be connected to each other to form an alkylidene group having the number of carbon atoms of 1-10, or $R_1$ or $R_2$ may be connected to any one of $R_3$ and $R_4$ to form a saturated or unsaturated cyclo alkyl having the number of carbon atoms of 4-12 or an aryl having the number of carbon atoms of 6-24;

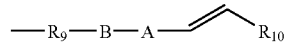

Formula 1a

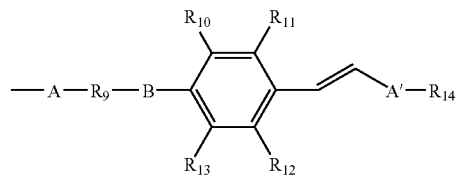

Formula 1b

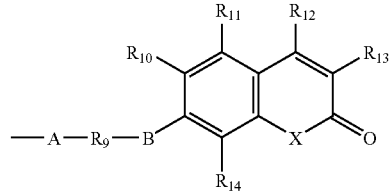

Formula 1c

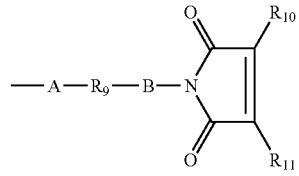

Formula 1d in the above Formulae 1a, 1b, 1c, and 1d,

A and A' is substituted or unsubstituted alkylenes having the number of carbon atoms of 1-20, carbonyl, carboxy, or substituted or unsubstituted arylenes having the number of carbon atoms of 6-40;

B is oxygen, sulfur, or —NH—;

X is oxygen or sulfur;

$R_9$ is a group selected from the group consisting of a simple bond, substituted or unsubstituted alkylenes having the number of carbon atoms of 1-20, substituted or unsubstituted alkenylenes having the number of carbon atoms of 2-20, substituted or unsubstituted saturated or unsaturated cycloalkylenes having the number of carbon atoms of 5-12, substituted or unsubstituted arylenes having the number of carbon atoms of 6-40, substituted or unsubstituted aralkylenes having the number of carbon atoms of 7-15, and substituted or unsubstituted alkynylenes having the number of carbon atoms of 2-20; and $R_{10}$, $R_{11}$, $R_{12}$, $R_{13}$, and $R_{14}$ are independently a group selected from the group consisting of substituted or unsubstituted alkyls having the number of carbon atoms of 1-20, substituted or unsubstituted alkoxys having the number of carbon atoms of 1-20, substituted or unsubstituted aryloxys having the number of carbon atoms of 6-30, and substituted or unsubstituted aryls having the number of carbon atoms of 6-40.

2. The composition for forming a liquid crystal alignment film according to claim 1, wherein the non-hydrocarbonaceous polar group in the Formula 1 is selected from the following functional groups:

—$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$,

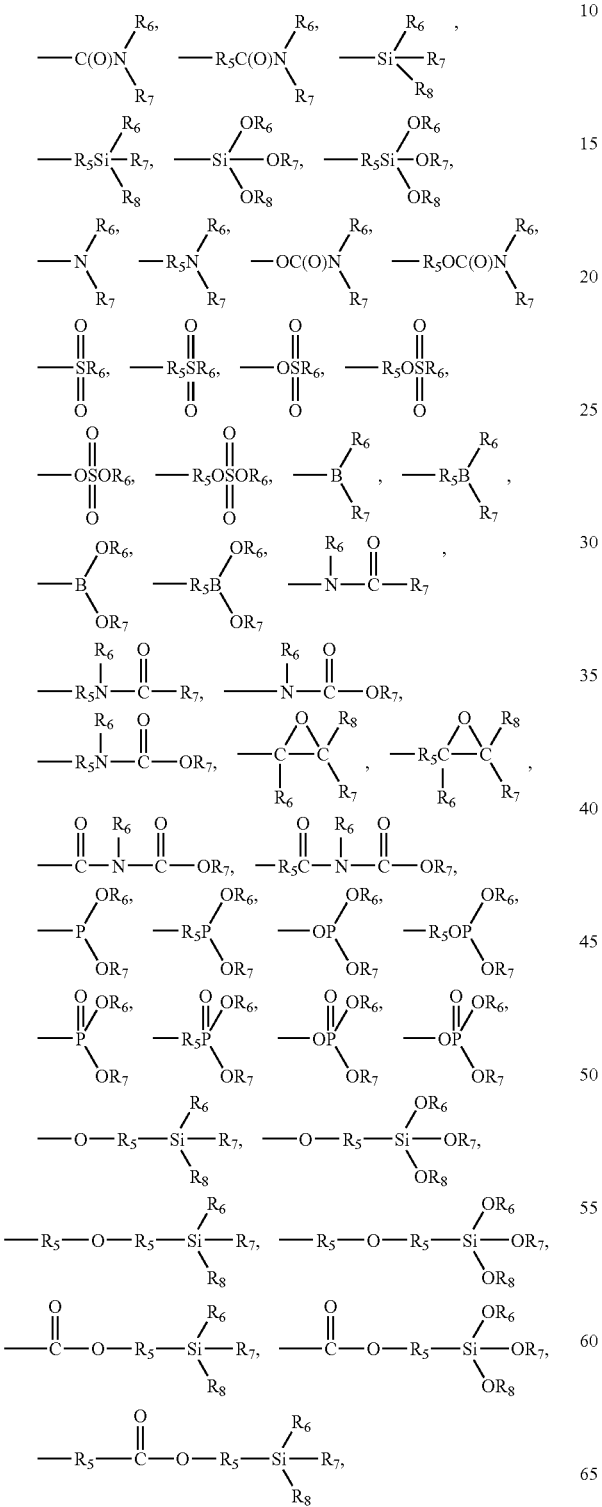
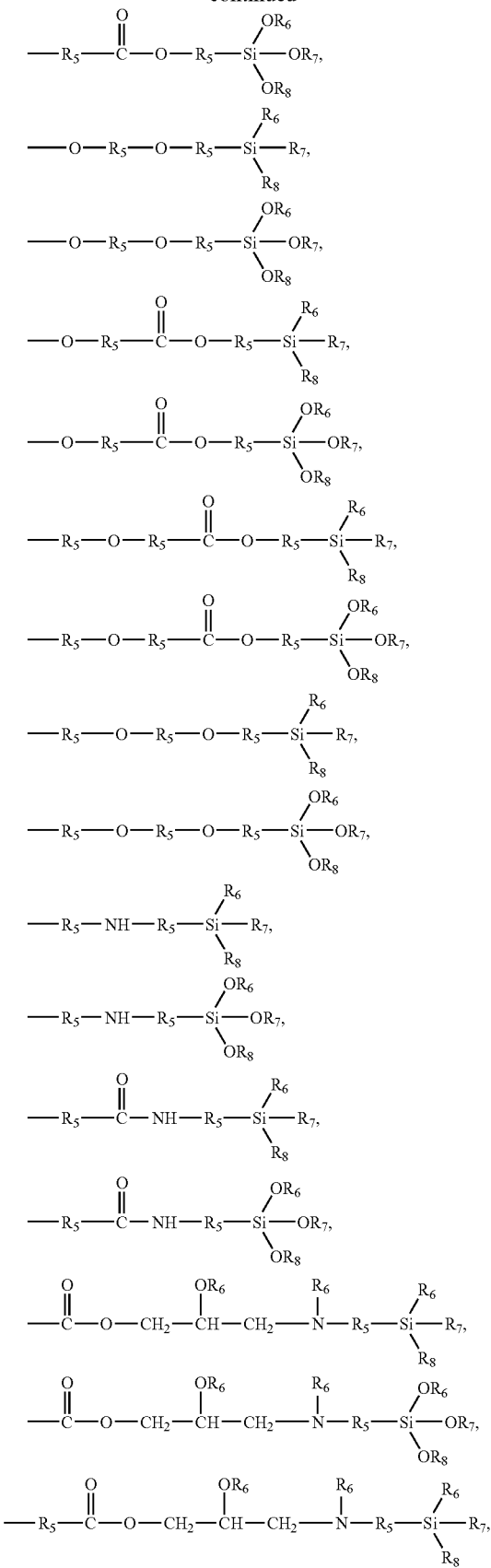

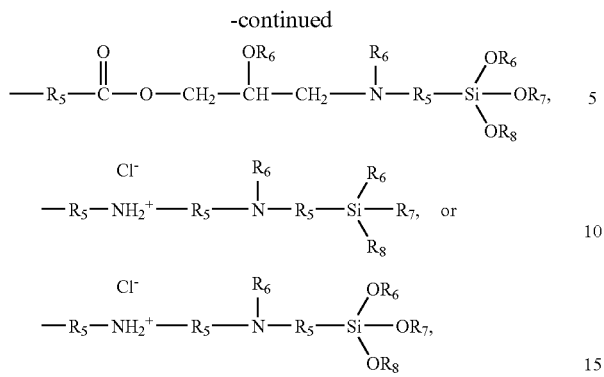

in the above examples of the non-hydrocarbonaceous polar group, each $R_5$ is selected from the group consisting of substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, and substituted or unsubstituted alkynyls having the number of carbon atoms of 2-20; and $R_6$, $R_7$, and $R_8$ are independently selected from the group consisting of hydrogen, halogens, substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, and substituted or unsubstituted alkynyls having the number of carbon atoms of 2-20.

3. The composition for forming a liquid crystal alignment film according to claim 1, wherein the polymer has the degree of polymerization of 50-5000.

4. The composition for forming a liquid crystal alignment film according to claim 1, wherein the polymer comprises a structural unit of the following Formula 2 or 3:

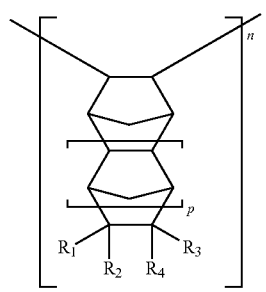

Formula 2

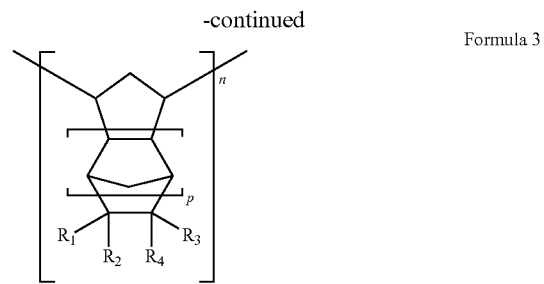

Formula 3 in the above Formulae 2 and 3, n is 50-5,000, and p, $R_1$, $R_2$, $R_3$, and $R_4$ are as defined in the above Formula 1.

5. The composition for forming a liquid crystal alignment film according to claim 1, wherein the component for polymerization further comprises the compound of the following Formula 4, linear olefins, or mixtures thereof:

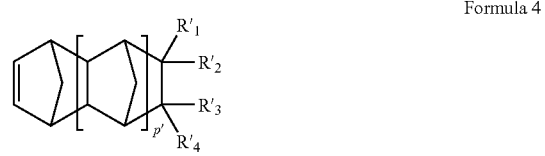

Formula 4

In the above Formula 4, p' is an integer ranging from 0 to 4;

$R'_1$, $R'_2$, $R'_3$, and $R'_4$ are independently a group selected from the group consisting of hydrogen, halogens, substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, substituted or unsubstituted alkynyls having the number of carbon atoms of 2-20, and a non-hydrocarbonaceous polar group including at least one of oxygen, nitrogen, phosphorus, sulfur, silicon, and boron; or $R'_1$ and $R'_2$, or $R'_3$ and $R'_4$ may be connected to each other to form an alkylidene group having the number of carbon atoms of 1-10, or $R'_1$ or $R'_2$ may be connected to any one of $R'_3$ and $R'_4$ to form a saturated or unsaturated cycloalkyl having the number of carbon atoms of 4-12 or an aryl having the number of carbon atoms of 6-24.

6. The composition for forming a liquid crystal alignment film according to claim 5, wherein the non-hydrocarbonaceous polar group in the Formula 4 is selected from the following functional groups:

—$OR_6$, —$OC(O)OR_6$, —$R_5OC(O)OR_6$, —$C(O)OR_6$, —$R_5C(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—$OR_6$, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$, —$R_5C(=S)SR_6$, —$R_5SO_3R_6$, —$SO_3R_6$, —$R_5N=C=S$, —NCO, —$R_5$—NCO, —CN, —$R_5CN$, —NNC(=S)$R_6$, —$R_5NNC(=S)R_6$, —$NO_2$, —$R_5NO_2$,

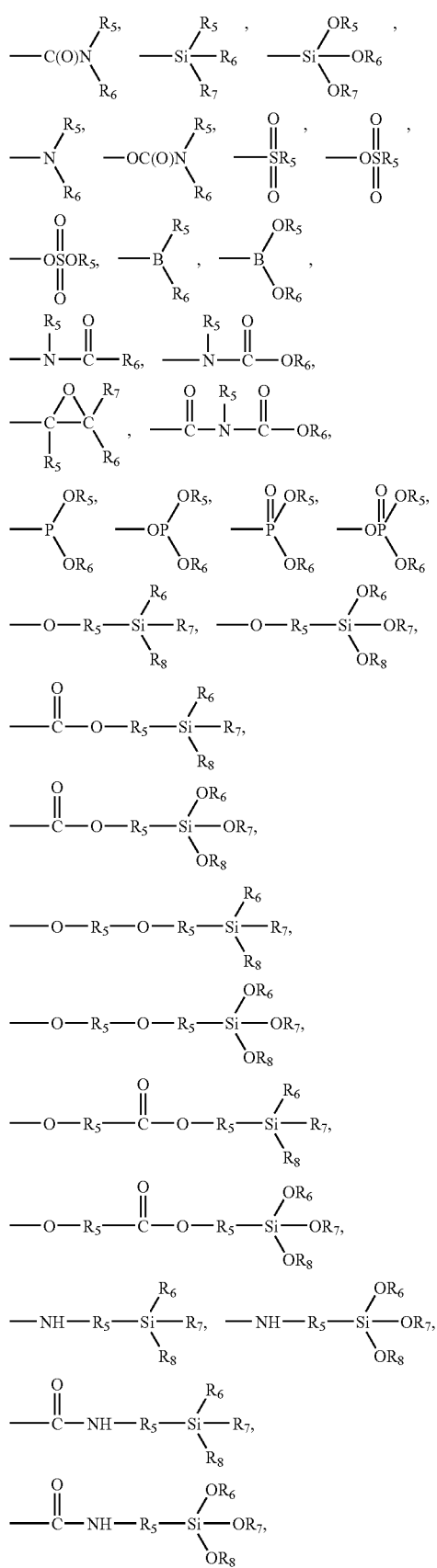

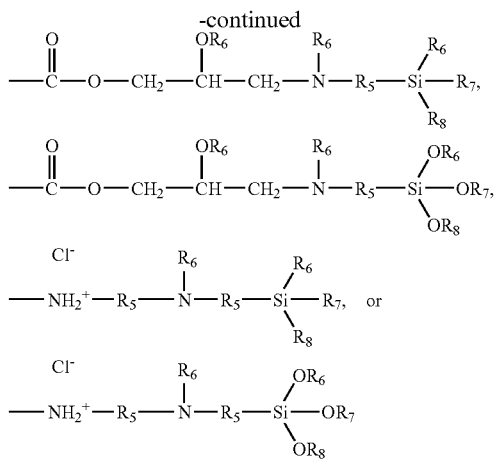

in the above examples of the non-hydrocarbonaceous polar group, each $R_5$ is selected from the group consisting of hydrogen, halogens, substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, and substituted or unsubstituted alkynyls having the number of carbon atoms of 2-20; and $R_6$, $R_7$, and $R_8$ are independently selected from the group consisting of hydrogen, halogens, substituted or unsubstituted alkyls having the number of carbon atoms of 1-20, substituted or unsubstituted alkenyls having the number of carbon atoms of 2-20, substituted or unsubstituted saturated or unsaturated cycloalkyls having the number of carbon atoms of 5-12, substituted or unsubstituted aryls having the number of carbon atoms of 6-40, substituted or unsubstituted aralkyls having the number of carbon atoms of 7-15, and substituted or unsubstituted alkynyls having the number of carbon atoms of 2-20.

7. The composition for forming a liquid crystal alignment film according to claim 5, wherein the linear olefins are selected from the group consisting of α-olefins having the number of carbon atoms of 1 to 20, butadiene, and pentadiene.

8. The composition for forming a liquid crystal alignment film according to claim 5, wherein the polymer comprises a structural unit of the following Formula 5:

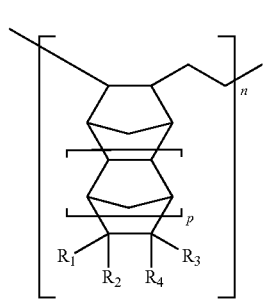

Formula 5 in the above Formula 5, $R_1$, $R_2$, $R_3$, $R_4$, and p are as defined in the above Formula 1, and n is 50-5,000.

9. A method of producing a liquid crystal alignment film comprising
(a) applying the composition for forming a liquid crystal alignment film according to claim 1 on a substrate; and
(b) radiating polarized ultraviolet rays to form the alignment film.

10. The method of producing liquid crystal alignment film according to claim 9, further comprising (c) annealing the alignment film at a temperature that is the same as or lower than the glass transition temperature of the alignment film.

11. An alignment film produced using the composition for forming a liquid crystal alignment film according to claim 1.

12. A liquid crystal display device having the alignment film according to claim 11.

13. An alignment film produced using the composition for forming a liquid crystal alignment film according to claim 2.

14. An alignment film produced using the composition for forming a liquid crystal alignment film according to claim 3.

15. An alignment film produced using the composition for forming a liquid crystal alignment film according to claim 4.

16. An alignment film produced using the composition for forming a liquid crystal alignment film according to claim 5.

17. An alignment film produced using the composition for forming a liquid crystal alignment film according to claim 6.

18. An alignment film produced using the composition for forming a liquid crystal alignment film according to claim 7.

19. An alignment film produced using the composition for forming a liquid crystal alignment film according to claim 8.

* * * * *